United States Patent [19]
Masreliez

[11] Patent Number: 5,235,557
[45] Date of Patent: Aug. 10, 1993

[54] COMBINED SPEED AND DEPTH SENSOR TRANSDUCER

[76] Inventor: Karl Masreliez, 14606 SE. 50th St., Bellevue, Wash. 98006

[21] Appl. No.: 835,757

[22] Filed: Feb. 13, 1992

[51] Int. Cl.$^5$ ............................................ G01S 15/60
[52] U.S. Cl. ...................................... 367/91; 367/908
[58] Field of Search ................ 367/91, 90, 89, 99, 367/908; 73/290 V, 291; 340/621

[56] References Cited

U.S. PATENT DOCUMENTS

| | | |
|---|---|---|
| 3,818,425 | 6/1974 | Peynaud et al. . |
| 4,017,823 | 4/1977 | Cooke et al. . |
| 4,104,912 | 8/1978 | Clavelloux et al. . |
| 4,166,229 | 8/1979 | DeReggi et al. . |
| 4,264,788 | 4/1981 | Keidel et al. . |
| 4,604,542 | 8/1986 | Thompson . |
| 4,633,119 | 12/1986 | Thompson . |
| 4,685,093 | 8/1987 | Gill . |
| 4,837,750 | 6/1989 | Saunders ................ 367/91 |
| 4,905,207 | 2/1990 | Fellinger et al. . |
| 4,918,672 | 4/1990 | Iwabuchi et al. . |

Primary Examiner—Daniel T. Pihulic
Attorney, Agent, or Firm—Seed and Berry

[57] ABSTRACT

A combined speed and depth transducer adapted to be mounted flush in the hull of a ship. An acoustic depth transducer is mounted piggyback on top of an acoustic speed transducer within a single housing. A base plate is sandwiched between the depth transducer and the speed transducer. The dimensions and frequency of transmission of the transducers are selected to prevent ringing in one transducer that may be caused by the acoustic wave of the other transducer. The base plate 40 is constructed to damp the acoustic wave transmitted by the speed transducer and be transparent to the acoustic wave transmitted by the depth transducer. Having the depth and speed transducers mounted within a common housing, and flush with the hull of the ship, provides the advantage of having to make only a single hole in the hull as well as having a low drag.

19 Claims, 3 Drawing Sheets

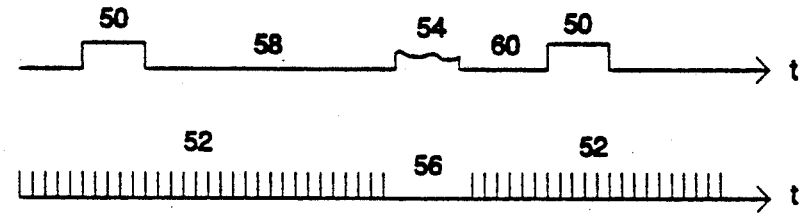
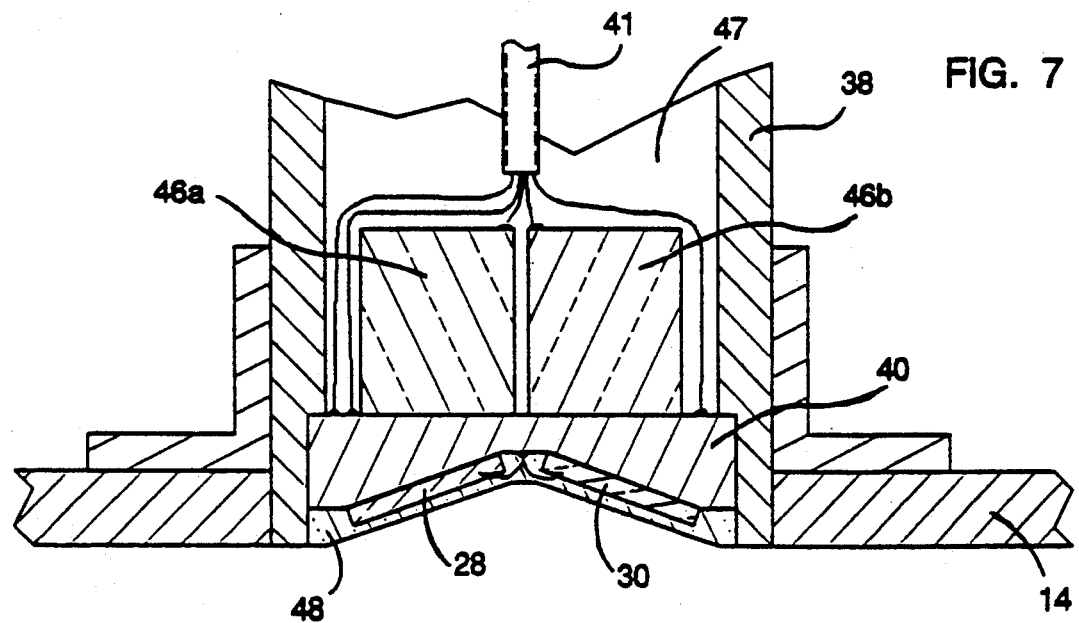

COMBINED SPEED AND DEPTH SENSOR TRANSDUCER

TECHNICAL FIELD

This invention relates to a combined ship speed and water depth sensor and, more particularly, to a combined sensor having ultrasonic transducers mounted on a common base plate within a single housing and emitting acoustic waves to determine the ship's speed and depth of the water.

BACKGROUND OF THE INVENTION

While a ship is moving through the water, it is desirable to know the speed at which the ship is moving. A variety of sensors for determining the ship's speed with respect to the water are presently available. These sensors include conventional paddle-wheel sensors, ultrasonic Doppler shift sensors, a pair of side by side acoustic transducers, or other devices.

The boundary layer at the hull of the ship creates difficulties in accurately measuring the speed because of friction between the hull and the water. A speed measurement within the boundary layer will be inaccurate. Therefore, most speed sensors must stick out of the hull beyond the boundary layer to provide an accurate measurement. This makes the sensor vulnerable to damage by debris in the water. It also creates considerable drag on the ship, which is a factor in sailboat racing and for high-speed motor boats.

Accurately measuring the depth of the water is also a frequent requirement on ships. A variety of depth measurement sensors are known in the art. A common depth sensor is an acoustic transducer which bounces an acoustic wave off of the bottom. The time lapse between the transmission and reception is proportional to the depth of the water.

There are many different versions of acoustic depth sensors, including flush mounted transducers, transom mounted transducers, faired bronze transducers extending from the hull, and the like. The advantage of the transom mount is that a hole through the hull is not necessary. The disadvantage is that extra drag on the ship is created and that the transducer is more vulnerable to being damaged. The advantage of a flush mount or mushroom mounted transducer is that less drag is created and that the transducer is more protected from being damaged. However, a hole must then be drilled through the hull for mounting the depth transducer, separate from any hole which was made for the speed transducer. It is therefore desirable to obtain a sensor which combines the functions of determining the speed of the ship as well as the depth of the water into a single housing that can be mounted flush with the hull of the ship.

SUMMARY OF THE INVENTION

According to principles of the present invention, a combined speed and depth sensor is provided for mounting on a ship. The combined speed and depth sensor includes a housing adapted to be mounted flush with the hull of a ship. An acoustic speed transducer is mounted on a base plate within the housing. The speed transducer emits acoustic waves into the water and receives acoustic waves reflected from the water to determine the speed of the ship relative to the water. An acoustic depth transducer is mounted on the same base plate. The depth transducer emits acoustic waves into the water for impinging against the bottom and receives acoustic waves reflected from the bottom for determining the depth of the water.

The base plate serves as a mechanical support and acoustic device within the housing. The speed transducer and the depth transducer are mounted on, and supported by, the base plate. The base plate also acoustically separates the speed transducer from the depth transducer. When the speed transducer emits an acoustic wave it is projected omnidirectionally, both into the water and into the housing. Within the housing it may reflect off of walls, causing an undesirable ringing. Ringing in the depth transducer may also be caused by the speed transducer. In addition, the speed transducer must recover quickly after transmission to receive echoes because it receives signals reflected from approximately eight cm away, within one hundred microseconds after transmission. The base plate is constructed of a material that attenuates the acoustic wave emitted by the speed transducers. Any ringing produced by the speed transducers is therefore rapidly attenuated within the housing to prevent undesirable interference from the ringing.

In one embodiment of the invention, the depth transducer is mounted piggyback, on top of the speed transducer. The base plate is sandwiched between the depth transducer and the speed transducer. In this embodiment, the acoustic wave from the depth transducer must pass through the base plate and the speed transducer before entering the water. Further, the return depth signal must pass through the speed transducer and base plate to be received by the depth transducer. The base plate is therefore selected to be transparent to the frequency that is transmitted by the depth transducer. The speed transducer is also selected to be transparent to the acoustic wave of the depth transducer. The base plate is analogous to an electronic low pass filter, letting through the frequency of the depth transducer's acoustic wave while blocking and rapidly attenuating the frequency of the speed log transducer's acoustic wave.

The material for the base plate is selected to be transparent to the acoustic frequency of the depth acoustic wave and block the frequency of the speed acoustic wave. In one embodiment, a glass fiber reinforced plastic has been shown suitable for use as the base plate. The type of glass fiber from which printed circuit boards are constructed has been successfully used as the base plate to achieve the desired dampening of the frequency of the speed acoustic signal and the transparency to the frequency of the depth acoustic signal. In some embodiments, several layers of the glass fiber have been laminated together in order to achieve the desired attenuation of the speed acoustic wave.

BRIEF DESCRIPTION OF THE DRAWINGS

FIG. 6A is a pair of time lines showing the timing relationship between the depth pulses and the speed pulses.

FIG. 6B is a second pair of time lines showing the timing relationship of the depth pulses and speed pulses according to a second embodiment.

FIG. 7 is a cross-sectional view of an alternative embodiment of the combined sensor.

DETAILED DESCRIPTION OF THE INVENTION

Figure 1:
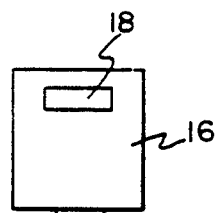
FIG. 1 is a schematic of separate speed and depth sensors mounted in the hull of a ship as is known in the prior art.

As shown in FIG 1, a speed sensor 10 and a depth sensor 12 are mounted in a hull 14 of a ship. The speed sensor 10 and depth sensor 12 produce electrical signals indicative of the ship's speed and depth of the water, respectively. The outputs of the speed sensor 10 and depth sensor 12 are input to electronic circuitry 16 and the results displayed on a display 18. The electronic circuitry 16 is contained in one or more electronic units, and the speed and depth displayed simultaneously on different displays 18, or alternatively displayed on a single display 18.

A variety of speed sensors are known in the prior art. (The speed sensor may also be called a log transducer or log sensor in the art.) The speed sensor for pleasure boats is usually an impeller or a paddle wheel that is rotated by water as the ship moves through the water. The rate of rotation of the paddle is proportional to the boat speed or, more precisely stated, proportional to the water speed with respect to the boat at the sensor location. Different versions of existing paddle-wheel speed sensors include hull mounted, flush with the hull, a mushroom mount, and a transom mount. Doppler shift speed sensors are also known in the art. According to the well known principles of measuring speed based on Doppler shift, an acoustic wave is propagated into the water and the Doppler shift experienced by the acoustic wave reflected by the water is measured to determine the speed of the boat with respect to the water.

Figure 2A:
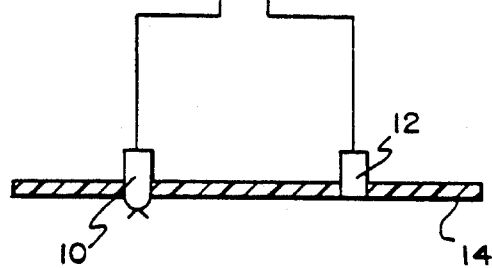
FIG. 2A is a cross-sectional view of a housing having a speed and depth transducer within the same housing as is known in the prior art.
Figure 2B:
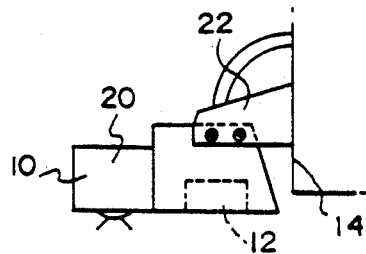
FIG. 2B is a side elevational view of a transom mounted housing having a depth sensor and speed sensor therefor.

As shown in FIGS. 2A and 2B, it is known in the prior art to combine the speed and depth sensors within a single housing 20 extending out of the hull 14. Many known existing combined speed and depth sensors, due to their large size, cannot be mounted flush with the hull. The housing protrudes significantly from the hull, such as a faired bronze mounting, and is thus prone to being damaged. Alternatively, as shown in FIG. 2B, the housing 20 can be a transom mount housing extending from the side of a hull 14 held by a support arm 22. The transom mount may be damaged as the ship docks. In addition, any housing that protrudes from the hull increases drag considerably, which is an important consideration in sailboats and for high-speed motorboats. Therefore, in those application where reducing drag is important, two separate sensor installations, each mounted flush with the hull, must be made.

Figure 3:
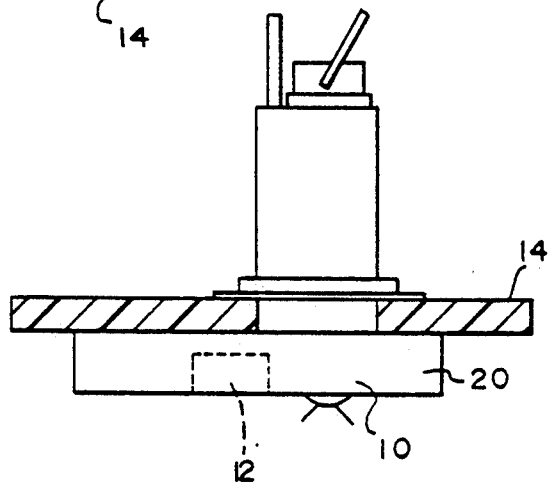
FIG. 3 is a cross-sectional view of a speed sensor known in the prior art.

FIG. 3 illustrates a relatively new prior art acoustic speed sensor. This acoustic speed sensor is of the type currently being manufactured and sold on the open market by a company titled Consilium Marine AB, of Sweden, and presently used on large merchant vessels.

This prior art speed sensor 10 includes a housing 24 having a base plate 26 mounted therein. Two acoustic transducers 28 and 30 are connected to the bottom of the base plate 26 and positioned for transmitting acoustic waves into the water. The two acoustic transducers are positioned one after the other in the direction of travel of the ship. An acoustic window that is substantially flush with the hull permits the acoustic waves to pass therethrough and into the water. The distances between the respective center of the two transducers is approximately 10 mm. The transducers 28 and 30 simultaneously transmit ultrasonic energy into the water. The acoustic wave is transmitted in short pulses. Immediately after transmission from the speed transducers 28 and 30, they are switched to the receiver mode to receive the reflection of the acoustic signal from the water. The timing for receiving the acoustic signals from the water is selected to receive the echoes in the range of seven to nine cm from the ship hull 14 so that it is outside the boundary layer. The acoustic frequency is generally in the range of 4 to 5 MHz.

As shown in FIG. 3, because the two transducers 28 and 30 are positioned one after the other in the longitudinal direction of travel of the ship, the aft transducer 30 travels the same path through the water as the forward transducer 28. Each transducer 28 and 30 transmits acoustic signals into the water and receives them from the water repeatedly, at a selected rate, such as 2 kHz. The signals received by the forward transducer 28 are stored. The signals received by the aft transducer 30 are compared to the signals previously received by the forward transducer 28. When the aft transducer 30 has moved forward in the water, the signal received by the aft transducer 30 will correlate to the signal previously received by the forward transducer 28, when it was over that same point of water earlier in time. The time difference between when transducer 28 passed over a spot and transducer 30 passed over the same spot can be used to determine the ship's speed, that is, the signal received by the aft transducer 30 will correlate to that previously received by the forward transducer 28, but with a time delay $\tau$ that is inversely proportional to the speed of the ship. This time delay is measured and given the separation S between the two acoustic beams at the sampling distance, the ship's speed can be determined according to the formula:

$$\tau = \frac{S}{V}. \tag{1}$$

The speed V of the ship can thus be accurately determined because the other values are known. As will be appreciated, this technique may require averaging and correlation techniques known in the art, this sensor being commercially available from Consilium Marine AB of Sweden.

A variety of depth sensors are also known in the art. Most common depth sensors have an acoustic transducer for reflecting acoustic waves off of the water bottom and back to the transducer, now acting also as a receiver. The measured time delay, $\tau$, between transmission and reception is proportional to the water depth below the transducer according to the formula:

$$\tau = \frac{2D}{C} \tag{2}$$

where D is the water depth and C is the speed of sound in the water.

There are many different housings for mounting depth transducers, including a faired bronze housing extending out of the hull, a round bronze housing, a transom mount housing, a flush mount with the hull, and a mushroom mount. Each of the currently available mounts for a depth sensor has advantages for specific applications.

Figure 4:
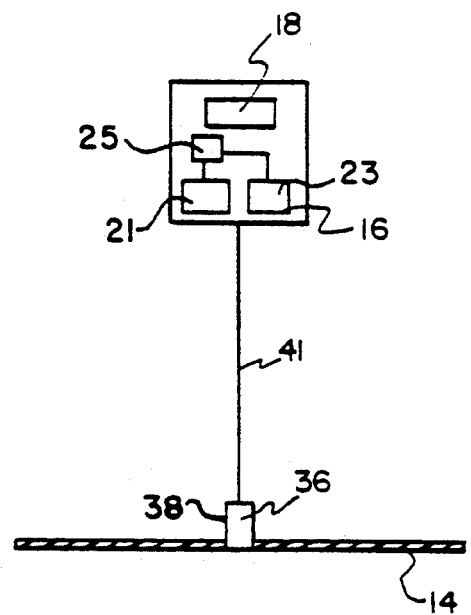
FIG. 4 is a block diagram of a combined speed and depth sensor according to principles of the present invention.

FIG. 4 illustrates a combined speed and depth sensor 36 within a single housing 38 according to principles of the present invention. The speed sensor and depth sensor are mounted within a single housing that is flush with the hull 14 of the ship. The output of the combined speed and depth sensor 36 is fed to an electronic circuit 16, and the results shown on display 18. An electric cable 41 extends from the electronic circuitry 16 to the housing 38 for transmitting electrical pulses to and from the transducers mounted within the housing.

Figure 5:
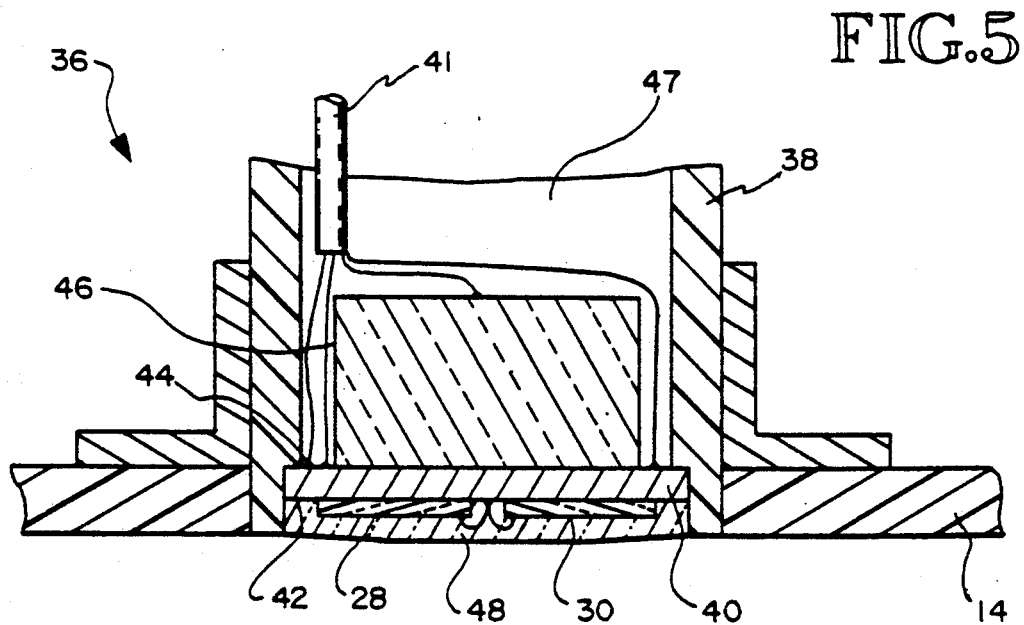
FIG. 5 is an enlarged, cross-sectional view of the combined sensor of FIG. 4 showing a combined speed and depth sensor according to principles of the present invention.

FIG. 5 illustrates the details of one embodiment of the combined sensor 36. The combined sensor 36 includes a housing 38 adapted to be mounted in a hull 14 of a ship. A base plate 40 of a selected construction (as explained later herein) is fixedly mounted within the housing 38. The base plate 40 has a bottom surface 42 to which acoustic speed transducers 28 and 30 are coupled. The base plate 40 has a top surface 44 to which a depth transducer 46 is mounted. The depth transducer 46 is thus mounted in a piggyback fashion on top of the speed transducers 28 and 30 with the base plate 40 sandwiched therebetween. Electric wires in a cable 41 are connected to the transducers 28, 30, and 46 in any acceptable manner to electrically connect them to the electronic circuit 16.

An acoustic window 48 covers the base plate 40 and the transducers 28 and 30 to ensure that the housing 38 is watertight. The window 48 is transparent to the acoustic signals. A suitable material for the acoustic window 48 is epoxy, polyurethane, or other materials known in the art. This acoustic window 48 is cast in place under vacuum to eliminate any trapped air bubbles in the resin which, if present, would scatter the transmitted and received acoustic waves.

The base plate 40 provides the mechanical support for the depth transducer 46 and speed transducers 28 and 30 within the housing 38. In one embodiment, the housing 38 is generally hollow around the depth transducer 46; air is in space 47 and is the backing material for the transducers. In an alternative embodiment, the housing 38 is filled with an epoxy or some other appropriate acoustic material to provide backing and mechanical support for the depth transducer 46, base plate 40, and cable 41.

Each of the transducer elements 28, 30 and 46 are cemented to the base plate 40 and care is taken to achieve good acoustical contact as well as electrical contact with the base plate 40. The base plate 40 is provided with the necessary electrical wires to provide the electrical connections for the transducers 28, 30, and 46.

The depth transducer 46 mounted to the top surface 44 of the base plate 40 is sized and designed to emit an acoustic wave at a particular selected frequency, usually a low frequency. This frequency is usually in the range of 150 kHz to 200 kHz, but could be any desired value based on the design parameters as explained herein. For a frequency in the range 150-200 kHz, the depth transducer would generally have the diameter in the range of 2-4 cm.

The speed transducers 28 and 30 are dimensioned to emit an acoustic wave at a relatively high frequency, the frequency generally having a value selected to be in the range of 4-5 MHz. An acoustic transducer emitting at this frequency generally has a diameter of less than 2 cm and a thickness which is quite small, being in the range of 0.5 mm.

The base plate 40 is constructed to provide a specific function to enhance the operation of the combined speed and depth sensor. As previously stated, the depth transducer 46 is mounted piggyback on top of the speed transducers 28 and 30. The base plate 40 acoustically separates the depth transducer 46 from the speed transducers 28 and 30. The base plate 40 also provides a window for the depth transducer 46.

As will be appreciated, when the speed transducers 28 and 30 emit an acoustic wave, the sound is transmitted essentially omnidirectionally. That is, the acoustic wave is projected in all directions including forward into the water and backwards into the base plate 40. The acoustic wave could enter the depth transducer 46 and the housing 38, including the sidewalls and reverberate throughout the housing 38 and the transducer 46, causing significant ringing.

The base plate 40 is selected to efficiently attenuate and dampen the frequency at which the speed transducers 28 and 30 emit an acoustic wave. It is also important to minimize the ringing in the depth transducer 46 which may inadvertently be caused by acoustic waves transmitted by the speed transducers 28 and 30. Because the received acoustic wave for determining the speed is reflected approximately 8 cm from the ship's hull, the return pulse is received approximately 100 microseconds after transmission. The speed transducers 28 and 30 must recover and be ready to act as receivers to receive the echoes from the water within this time period. Any responses within the housing 38, including the walls, produced in the base plate 40 and in the transducer 46 must decay rapidly to an insignificant level so that the speed transducers can receive without interference. The material and the thickness of the base plate 40 is selected to provide this high attenuation and dampening of the acoustic wave from the speed transducers 28 and 30. As will be appreciated, the material and thickness of the base plate 40 is selected in conjunction with the transmission frequency of the speed transducers to ensure proper dampening at the operating frequency.

The base plate 40 must also be transparent to the acoustic wave emitted by the depth transducer 46. The speed transducers 28 and 30 are selected to have a thickness that will appear transparent to the acoustic wave of the depth transducer 46. As will be appreciated from viewing FIG. 5, the acoustic wave transmitted by the depth transducer 46 passes through the base plate 40, through the speed transducers 28 and 30, through the acoustic window 48 and into the water. All elements in front of the depth transducer 46 must be essentially transparent to the acoustic wave of the depth transducer 46. Further, when the signal reflected from the water bottom is received, it must first pass through the acoustic window 48, speed transducers 28 and 30, and base plate 40 before being received by the transducer 46, now acting as a receiving transducer.

The frequency for the speed transducers and the depth transducer is selected to permit independent operation without interference between them. In some embodiments, it may be necessary to ensure that the frequency of the two transducers are not subharmonics or harmonics of each other. As is known, a subharmonic of one frequency, such as ½, 1/16 or the like, can produce significant ringing in another object whose dimensions or frequency of operation match that of the subharmonic. Similarly, a transmitted frequency may produce a response in an object whose frequency of operation is an integer multiple or a harmonic of the transmitted frequency, such as 2, 4, or 8 times larger. The dimension of the transducers and the frequency which they emit is selected to ensure that secondary ringing caused by harmonics does not occur in any of them. This is done by selecting the proper thickness of base plate 40 and by judicious selection of the thickness and frequency of operation of transducers 28, 30, and 46 themselves. Therefore, the frequency for transmission by the transducers 28 and 30 is selected so that it does not cause a ringing in the transducer 46 and the frequency for transmission by the transducer 46 does not cause a ringing in the speed transducers 28 and 30.

The base plate must perform the dual function of being transparent to the frequency emitted by the depth transducer 46 and blocking the acoustic wave transmitted by the speed transducers 28 and 30. The base plate 40 may be compared to an electronic low pass filter, letting through the low frequency from the depth transducer 46 while blocking acoustic waves from the high frequency speed transducers 28 and 30. The base plate 40 may be constructed from any suitable element which fulfills these specifications.

In one embodiment, the base plate 40 is constructed from a composite material having the suitable mechanical properties for strength and the acoustical properties as described. Glass fiber reinforced plastic has been found suitable as a material for the base plate 40. In one embodiment, the fiberglass boards of the type used in printed circuit boards on which electrical circuits are mounted is acceptable. It may be necessary to provide several layers of the fiberglass material laminated together in order to achieve the desired attenuation of the acoustic wave from the speed transducers. In one embodiment a thickness in the range of 0.5-2 cm, and in particular, 1 cm, has been found suitable. The thickness and type of material is selected to provide the necessary dampening of the high frequency signal from the speed transducers.

In one embodiment, the base plate 40 also provides electrical connection to the transducers. A conductive pattern is placed on base plate 40 and connected to each of the transducer elements 28, 30, and 46.

Referring now to FIG. 4, the electronic circuit 16 includes electronic transmitters and receivers for causing the transducers to emit and receive the acoustic waves. In one embodiment, the depth and speed transducers operate independently and possibly simultaneously with each other. A depth transmitting and receiving circuit 21 and a speed sensor transmitting and receiving circuit 23 are provided in the electronic circuitry 16 to permit simultaneous operation, the acoustical separation being provided as described herein.

In an alternative embodiment, the electronic circuit includes a suitable timing circuit 25. The timing circuit 25 controls the timing of the transmission pulses to the depth transducer 46 and the speed transducers 28 and 30 to ensure that they are sufficiently spaced in time from each other. In one such timing scheme, the transducer elements are pulsed in such a way as to provide complete separation and ensure that there can be no crosstalk between the transducer elements. For example, the electronic circuit operates on a two second duty cycle with the speed transducers 28 and 30 transmitting and receiving for one second, and the depth transducer 46 is off. The speed transducers may have a plurality of speed measurements during that time period. For the second part of the duty cycle, the depth transducer 46 transmits and receives while the speed transducers 28 and 30 are off. The timing circuit 25 ensures that a transmitted pulse is received before another pulse is transmitted. The acoustic waves are separated from each other for each transducer, respectively.

FIGS. 6A and 6B illustrate two alternative embodiments of timing schemes for the depth transducer and the speed transducer. As shown in FIG. 6A, when a depth wave 50 is transmitted, a pause 64 in the transmission of speed waves is present and no speed waves 52 are transmitted and received. The pause 64 in the speed measurement is present because the reception of speed waves is disturbed by the transmission of the depth wave. While the depth wave is traveling, represented by time interval 58, numerous speed measurements are made as represented by speed waves 52. When a return depth wave 54 is anticipated, a pause 56 is created in sending and receiving of speed waves, because the transmission of speed waves disturbs the reception of the return depth wave. The timing of pause 56 is based on the anticipated time of receiving the return depth wave 54 and might be somewhat longer than pause 64 to ensure that the pause begins well before the return signal is actually received. After a recovery time or rest 60, another depth wave 50 is transmitted during a pause 64 and the timing repeated.

If the return pulse 54 is received when not expected (for example, if the water suddenly becomes very shallow), and the speed sensors are transmitting, the structure of the combined sensor advantageously still permits the return pulse 54 to be received and sensed, either in whole or in part, at transducer 46 because the transducers 28 and 30 and base 40 are transparent to the depth wave, even though the speed waves 52 are being sent and received. The timing of pause 56 based on when a return pulse 54 is expected is then changed according to the just received depth wave to ensure that there is a pause 56 during the return of the next depth signal, thus providing a return pulse 54 that is guaranteed free of all possible noise from or overlap with the speed sensor pulses 52. If the depth measurement is totally blocked by disturbing transmission of speed waves because the pause 56 in the transmission of speed waves is out of synchronization with the returning depth wave 54, the transmission of speed waves has to be inhibited until the correct depth is found again. Such an interruption of the speed measurement is usually short. Correct depth measurement is normally resumed within less than a second.

According to the further alternative embodiment of FIG. 6B, the speed sensor pulses 52 are transmitted and received simultaneously with the depth pulse 50. This is possible if the transmission of the depth pulse 50 does not disturb the reception of speed waves. A pause 56 is provided after a time interval based on the expected round trip time 58 of the returning depth wave 54. After a time 60, a depth wave 50 is transmitted again.

In the alternative embodiments of FIGS. 6A and 6B, the timer circuit 25 controls the transmission of the acoustic speed transducers to operate during the return time of the acoustic wave of the depth transducer 46. This is illustrated in FIG. 6A, which is a timing diagram showing the coordination of the emission of depth and speed waves. The depth transducer 46 emits an acoustic wave 50 and while the depth transducer 46 emits an acoustic wave and while it is travelling to the water bottom and being reflected for the return, the speed transducers 28 and 30 emit acoustic waves 52 and receive the reflected signals to provide an indication of the speed of the ship. The reflected signal 54 to the transducer 46 is then received and processed to determine the depth of the water. During the reception of the reflected depth wave by the depth transducer 46, there is a pause 56 in the emission of the acoustic waves from the speed transducers 28 and 30 in order not to disturb the reception of the reflected depth waves. Because the acoustic wave from the speed transducers 28 and 30 is reflected extremely close to the hull 14, it can make the entire round trip during the time interval that the acoustic wave from the depth transducer 46 is traveling, after it is emitted and before it is received, the water bottom being spaced a great distance from the hull 14. It may be possible for the speed transducers 28 and 30 to emit a plurality of pulses during the return time of a single pulse from the depth transducer 46. Also, during the time interval 60 between reception of the reflected depth wave 54 and the emission of the following depth wave 50, emission of speed waves 52 can take place and speed measurements be made. If the emission of depth wave 50 disturbs the speed measurement by causing ringing in the speed transducers 28 and 30, a pause 64 in the speed measurement might be necessary during the emission of the depth waves. If the emission of depth wave 50 does not disturb the speed measurement, a timing scheme like that of FIG. 6B can be used. The depth measurement proceeds without interruption by the speed measurement, while the speed measurement is only interrupted during the reception of the reflected wave 54. Caution is exercised to ensure that there is no crosstalk or ringing caused by one transducer signal in the other transducers, either by separation in timing or by selection of the dimensions based on the frequency that has been previously described.

Current depth gauges and speed sensors, such as the type shown in FIGS. 1-3, often include a temperature sensor within the housing for either the depth sensor or the speed sensor. According to principles of the present invention, a temperature sensor may be mounted in the same housing with the combination speed and depth sensor constructed according to principles of the invention. The speed sensor would be coupled with wires in the common cable 41 and connected to electronics in the housing for the electronic circuitry 16.

As shown in FIG. 7, the combined sensor in an alternative embodiment includes Doppler shift speed transducers 28 and 30 and a pair of depth transducer elements 46a and 46b. The Doppler shift speed transducers 28 and 30 are tilted at an angle with respect to the water to permit the Doppler shift measurements to be accurately made, as is known in the art. Individual Doppler shift transducers of this type are generally known in the art. Alternatively, the Doppler shift may be of the type which project slightly from the hull rather than in a recess, as shown in FIG. 7.

The depth transducer 46 may, alternatively, be composed of two individual transducers 46a and 46b. The pair of depth transducers can therefore be used as bottom speed transducer elements. That is, the speed of the ship relative to the sea bottom can be measured using depth transducers 46a and 46b. This pair of transducers 46a and 46b operate in a similar manner to that previously described with respect to speed sensors 28 and 30 to receive reflected signals from the bottom of the ocean and correlate the reflected waves and then determine the speed of the ship with respect to the sea bottom based on the distance the ship moves and the timing for when the signals correlate to each other. The individual pair of transducers 46a and 46b as bottom speed transducer elements are known in the art and are presently commercially available from Consilium Marine AB of Sweden. Similarly, stand-alone Doppler shift speed sensors are known in the art and are commercially available. The combining of a speed sensor with the depth sensor in piggyback fashion within a single housing is not known in the art and provides the advantages which have been described with respect to this invention.

Transmitting, receiving, and timing circuits are known in the art and are presently commercially available. Circuits could be used according to the principles taught herein to provide the desired signals and timing thereof. For example, the timing circuit could be a simple microprocessor that stores a selected timing enable and disable program and has an internal clock that is sufficiently accurate for the timing. Storage registers in the microprocessor could store the time intervals 58 and 60 and these values could be changed as needed according to the description herein.

The speed transducers 28 and 30 have been described in one embodiment to be of the type shown in the prior art of FIG. 3. As will be appreciated by those of ordinary skill in the art, any acceptable speed sensor may be used. A single transducer could be used in place of the two transducers for the speed transducers 28 and 30. This single transducer could be, for example, a Doppler shift transducer. The dimensions and frequency for such a Doppler shift transducer or other type of transducer are selected based on the principles explained herein to ensure that there is no acoustic interference between the speed acoustic wave and the depth acoustic wave. Various transducers may be selected and combined as desired to construct a combination depth sensor and speed sensor according to the teachings herein. For example, the single depth transducer 46 of FIG. 5 may be used with the two Doppler shift transducers of FIG. 7. Similarly, the two-element depth/speed transducer 46a and 46b may be used with the flat speed transducers 28 and 30 of FIG. 5. Other combinations will also be apparent to those of ordinary skill in the art. As will be appreciated, modifications to the embodiments described herein which operate in the same way are considered equivalent and fall within the scope of this invention.

I claim:

1. A combined speed and depth sensor for mounting in a ship, comprising:
    a housing adapted to be coupled to a hull of said ship;
    a base plate fixed within said housing, said base plate having a bottom side and a top side, said bottom side being adapted to face towards water and said top side being adapted to face away from said water;
    an acoustic speed transducer attached to said bottom side of said base plate and positioned within said housing, said acoustic speed transducer positioned for transmitting acoustic speed waves into said water and receiving acoustic speed waves reflect from said water; and an acoustic depth transducer attached to said top side of said base plate and positioned within said housing, said acoustic depth transducer positioned for transmitting acoustic depth waves through said base plate, through said speed transducer, into said water, to the bottom of said water and receiving acoustic depth waves reflect from the bottom of said water after passing through said speed transducer and said base plate, said base plate and said speed transducer being positioned between said depth transducer and said water.

2. The sensor according to claim 1 wherein said speed transducer is a Doppler shift transducer adapted to emit acoustic waves at an angle into said water and receive Doppler shifted acoustic waves from said water and further including:

a Doppler shift analysis circuit for determining the speed of said ship based on said Doppler shifted acoustic waves.

3. The sensor according to claim 1 wherein said base plate is comprised of material that is transparent to said acoustic depth waves such that said depth waves may pass through said base plate with little attenuation and said speed transducer is selected to be transparent to said acoustic depth waves such that said acoustic depth waves may pass through said speed transducer with little attenuation and without causing a significant response in said speed transducers.

4. The sensor according to claim 1 further including an acoustic window between said speed transducer and said water, said acoustic window being comprised of plastic that is watertight and transparent to acoustic signals.

5. The sensor according to claim 1, further including:

a speed transmitter circuit coupled to said speed transducer and adapted to transmit electrical signal to said speed transducer for causing said speed transducer to emit acoustic waves;

a depth transmitter circuit coupled to said depth transducer and adapted to transmit electrical signals to said depth transducer for causing said depth transducer to emit acoustic waves; and a timing circuit coupled to said speed transmitter circuit and to said depth transmitter circuit for controlling the timing of respective electrical signals emitted by said speed transducer and said depth transducer.

6. The sensor according to claim 5 wherein said depth wave is emitted a selected time after said speed wave, said selected time being sufficiently long to ensure that said speed transducer is disabled and at rest when said depth wave is transmitted.

7. The transducer according to claim 5 wherein said speed waves are emitted a selected time after a depth wave, said selected time being sufficiently long to ensure that said depth transducer is disabled and at rest when said speed waves are transmitted.

8. The sensor according to claim 5 wherein the emission of said speed waves are inhibited during the reception of depth waves that are reflected from the bottom of said water.

9. The sensor according to claim 5 wherein the reception of said speed waves that are reflected from said water is inhibited during the emission of said depth wave.

10. The sensor according to claim 1, further including a second acoustic speed transducer attached to said bottom side of said base plate and positioned within said housing, said second acoustic speed transducer positioned for transmitting acoustic waves into said water and receiving acoustic waves reflect from said water; and a circuit for analyzing the acoustic waves received by said speed transducer and by said second speed transducer for determining the speed of said ship based on the acoustic waves received by said speed transducers.

11. The sensor according to claim 1 wherein said base plate is a fiberglass board.

12. The sensor according to claim 1 wherein an electrical connector pattern is printed on said base plate, said base plate being a printed circuit board.

13. The sensor according to claim 1 wherein the thickness of said depth transducer is not an integer multiple of the wave length emitted by said speed transducer to ensure that a harmonic response is not generated in said depth transducer by said speed transducer.

14. The sensor according to claim 1 wherein the thickness of said speed transducer is selected taking into account the frequency of said acoustic depth wave to prevent a harmonic response in said speed transducer being caused by said depth wave.

15. The sensor according to claim 1 wherein said depth transducer includes a pair of two depth transducers positioned side by side, said pair depth transducers also being used to determine the speed of said ship with respect to the bottom of said water.

16. A method of sensing a ship's speed and the depth of water below the ship, comprising:

emitting a first acoustic wave into water adjacent said ship, said first acoustic wave being emitted by a first transducer mounted within a housing and fixed to a base plate;

receiving said first acoustic wave reflected from within said water;

processing said first reflected acoustic wave to determine said ship's speed;

emitting a second acoustic wave towards said water, said second acoustic wave being emitted by a second transducer mounted within said housing above said base plate and above said first transducer;

passing said second acoustic wave through said base plate and through said first transducer prior to said second acoustic wave entering said water, said first transducer and said base plate being positioned within said housing between said second transducer and said water, said base plate being substantially transparent to said second acoustic wave and substantially blocking said first acoustic wave;

receiving said second acoustic wave reflected from a bottom of said water; and processing said second reflected acoustic wave to determine the depth of water below said ship.

17. The method according to claim 16, further including:

attenuating said first acoustic signal with said base plate to dampen ringing of said first acoustic wave within said housing and within said second transducer.

18. The method according to claim 16, further including:

emitting and receiving said first acoustic wave simultaneously with emitting said second acoustic wave.

19. The method according to claim 16, further including:
disabling said first transducer so that it does not emit acoustic waves at a selected time interval after emitting said second acoustic wave, said selected time interval being based on the anticipated return time of said second acoustic wave reflected from the bottom of said water, receiving said second acoustic wave reflected from said bottom while said first transducer is disabled and is not transmitting any acoustic waves.

* * * * *